4 Sheets—Sheet 1.

G. W. CHENEY & D. C. BUTTERFIELD.
Ore-Roasting and Smelting-Furnaces.

No. 198,079. Patented Dec. 11, 1877

Attest:
S. W. Seely
R. N. Dyer

Inventor:
George W. Cheney
Don C. Butterfield
by Geo. W. Dyer & Co.
Attys.

4 Sheets—Sheet 2.

G. W. CHENEY & D. C. BUTTERFIELD.
Ore-Roasting and Smelting-Furnaces.

No. 198,079. Patented Dec. 11, 1877

Attest:
L. W. Seely
R. T. Dyer

Inventor:
George W. Cheney
Dan'l Butterfield
by Geo. W. Dyer & Co.
Att'y.

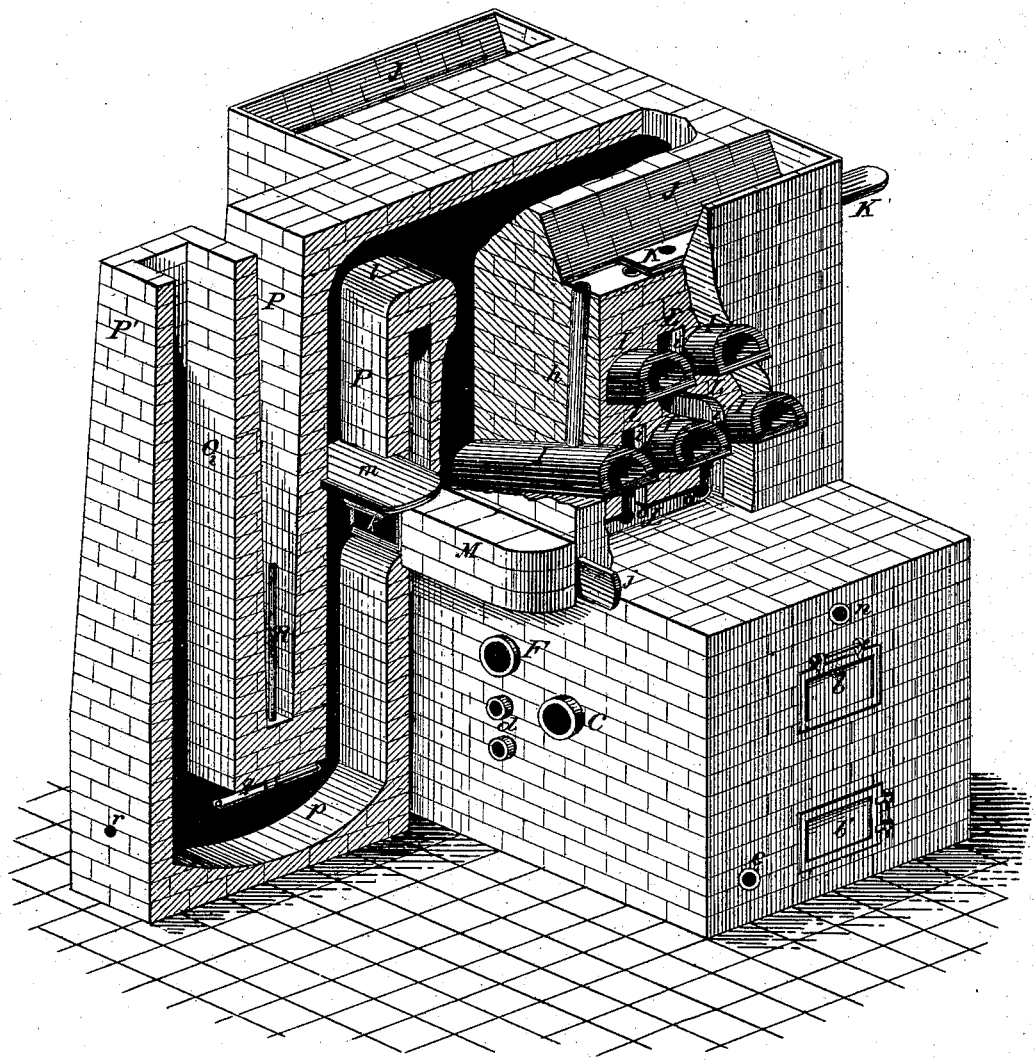

UNITED STATES PATENT OFFICE.

GEORGE W. CHENEY, OF WASHINGTON, DISTRICT OF COLUMBIA, AND DON C. BUTTERFIELD, OF NEW YORK, ASSIGNORS TO THEMSELVES, THEODORUS J. VAN WYCK, AND CHARLES M. NICHOLS, JR., OF BROOKLYN, AND JOHN T. SALTER, OF NEW YORK, N. Y., AND SANFORD D. SWEETSER, OF EAST HAMPTON, MASSACHUSETTS.

IMPROVEMENT IN ORE ROASTING AND SMELTING FURNACES.

Specification forming part of Letters Patent No. 198,079, dated December 11, 1877; application filed March 30, 1877.

*To all whom it may concern:*

Be it known that we, GEORGE W. CHENEY, of Washington, in the county of Washington and District of Columbia, and DON C. BUTTERFIELD, of New York, in the county of New York and State of New York, have invented a new and useful Improvement in Furnaces for Roasting and Smelting Ores; and we do hereby declare that the following is a full and exact description of the same, reference being had to the accompanying drawings, and to the letters of reference marked thereon.

The object we have in view is a furnace which shall be peculiarly adapted for the treatment in a cheap and speedy manner of refractory or rebellious ores, and more particularly lead ores containing sulphur, arsenic, and other noxious minerals in combination with more valuable metals, and for the saving of a large portion of the valuable metals now carried off in the form of vapor or fumes and wasted; and our invention therein, which is in the nature of an improvement upon that described in Letters Patent numbered 175,928, and granted to GEO. W. CHENEY, April 11, 1876, consists particularly in a double apron inclined in opposite directions, situated centrally in the furnace, connected by throats or passages with two receiving-chambers, between which the double apron is arranged, and with each of which its opposite slope is connected, which receiving-chambers are connected with suitable fire-boxes, pipes for conveying currents of air into the retorts, to aid in combustion therein; a novel water-pipe which serves to support as well as protect the dependent arches above the receiving-chambers; in hoppers with convenient slides arranged upon the top of the furnace connecting with the several retorts by sloping ducts or passages, and in the new combination and arrangement of the several operative parts, all as more fully hereinafter explained.

In order that those skilled in the art may know how to make and use our furnace, we proceed to describe the same, having reference to the drawings, in which—

Figure 1:
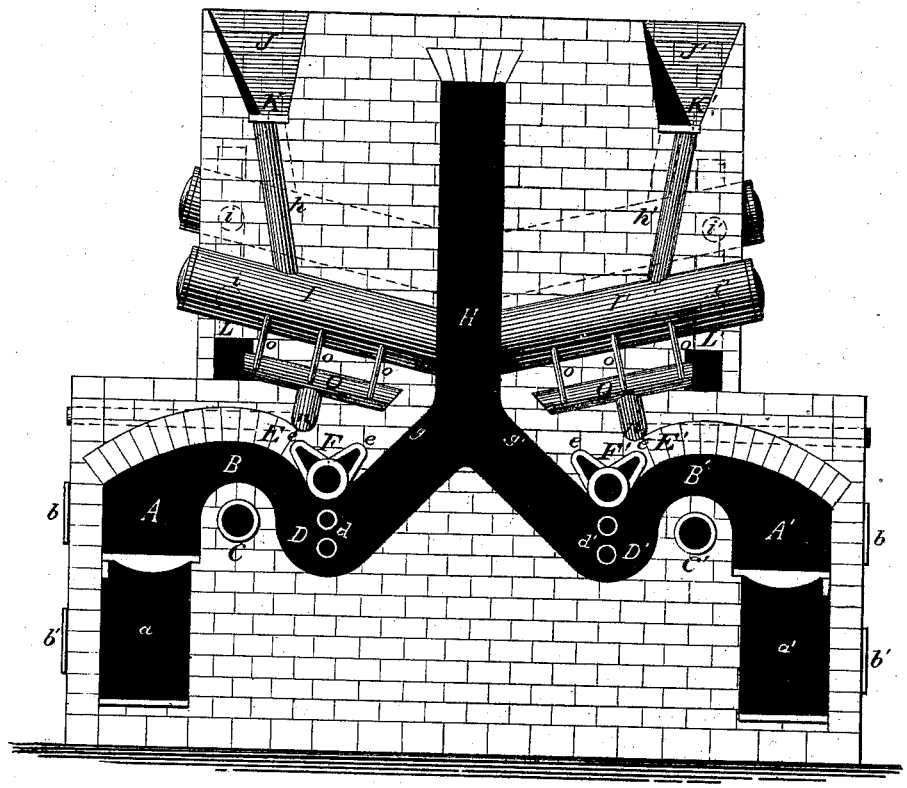
Figure 2:
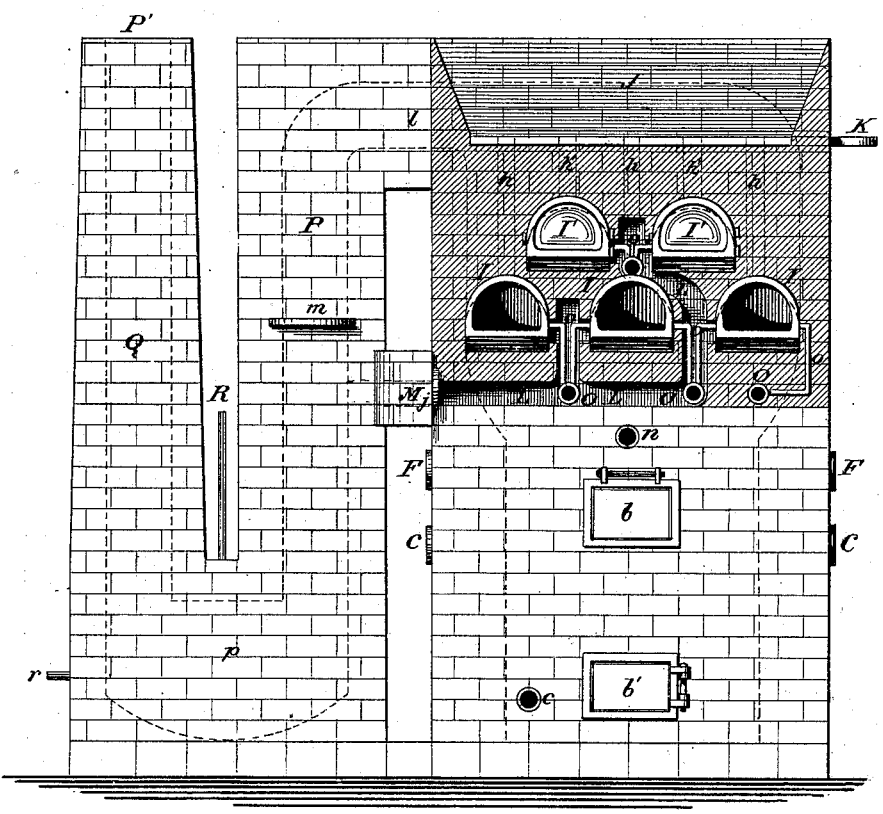
Figure 5:
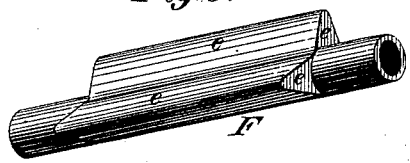
Figure 3:
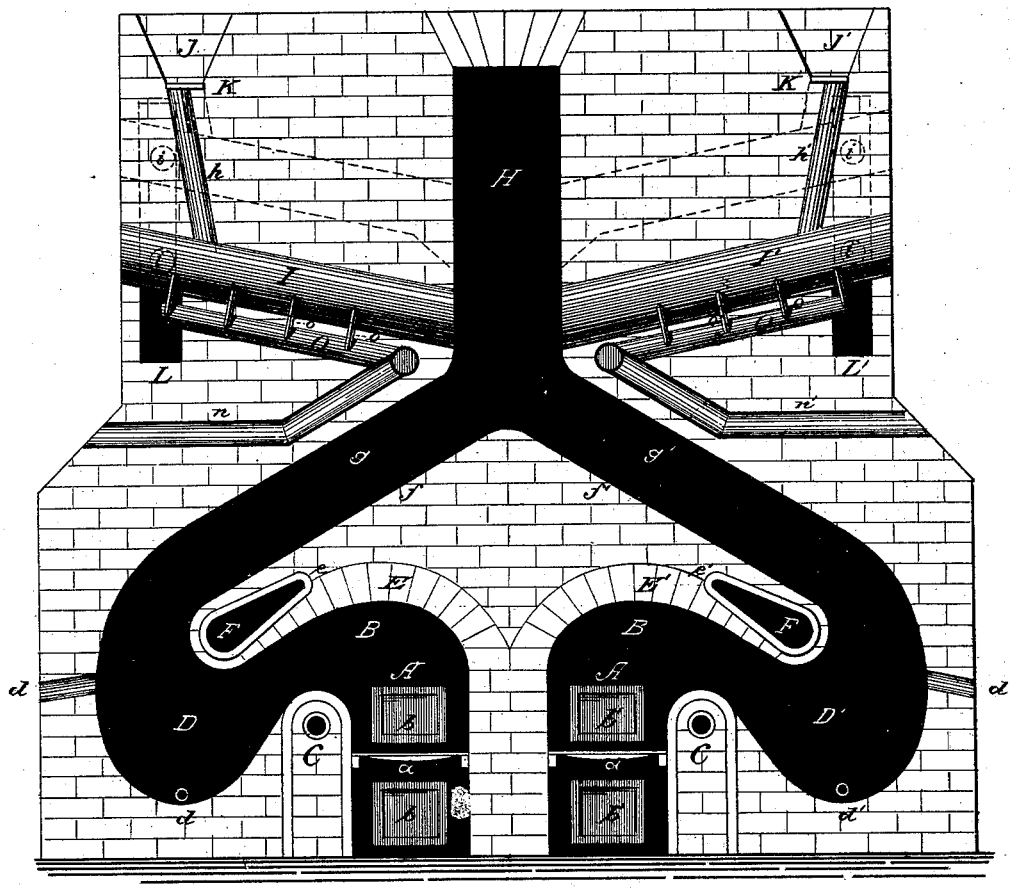

Figure 1 is an elevation of the furnace with the front wall of the same removed; Fig. 2, a side elevation of the same with a portion of the side walls removed; Fig. 3, a modification of Fig. 1, showing one central fire-box; Fig. 4, an elevation of the furnace, partly in perspective, seen from the rear; Fig. 5, a separate view of one of the water-pipes with wings.

Like letters denote corresponding parts in each figure.

In the drawings, A A' represent the fire-boxes, having ash-pits $a\ a'$ and doors $b\ b'$, for the introduction of fuel and the removal of ashes and other débris, and $c$ the opening for the admission of the hot-air blast, all of ordinary construction and arrangement. From the fire-boxes the products of combustion pass over arches B B', properly protected by water-pipes C C', and across the receiving-chambers D D, which have proper drawing-off pipes $d\ d$ for slag and for bullion, impinging in their passage against the dependent arches E E', which are protected by peculiar water-pipes F F', cast with wings $e\ e$, as shown in Fig. 5. These water-pipes are placed with the wings uppermost, which wings serve to better support the arch which rests upon this water-pipe. This pipe may be incased upon its lower surface with fire-brick, if found essential. The arches E E' are arranged preferably with their lowest dependent points directly above the center of each receiving-chamber, one side of which is formed by one side of the double apron, which has two equal opposite slopes, $ff'$.

The products of combustion passing across each receiving-chamber over the surface of the molten metal therein, are, by the interposition of the dependent arches E E', deflected very strongly directly against the slopes $f\ f'$, and then pass upward through the passages $g\ g'$ over these slopes into the main central flue H. The fire-boxes, ash-pits, arches, receiving-chambers, aprons, and the main central flue just named, are intended to extend across the entire interior of the furnace.

Retorts I I', made of proper refractory material, and preferably removable, are arranged on each side of the main flue H, in one or more rows, and in such numbers as may be required by the size and working capacity of the furnace, the sum of the area of all of which retorts in cross-section, however, should not be disproportioned to the area of the main flue in cross-section. Each of these retorts is placed in a sloping position, as shown in the drawings, sufficient to allow molten metal to flow downward by gravity, and is open at the end next to the flue, and has proper doors upon the outside of the furnace, adapted to be luted or otherwise closed tightly.

Upon the top of the furnace are hoppers J J', out of which lead channels $h$ $h'$, which slope a little downwardly toward the central flue H, and communicate with the tops of the retorts I I', by means of which the ore in the hoppers is fed into such retorts. In the bottom of each hopper is a slide-valve, K K', with openings corresponding with the channels $h$ $h'$, so that the flow of ore into such channels can be regulated by drawing out such slide-valve, or cut off altogether. Near the outer ends of each retort are openings $i$ $i'$, leading into flues L L', which flues in turn lead into a flue, M, at opposite ends thereof, and at the point where such flues enter the flue M there are dampers or valves $j$ $j'$. From the flue M there is an opening, $k$, into the main flue H of the stack. From the main central flue H, at its upper part, there is also an opening, $l$, into the stack-flue, and in this last-named flue there is a damper or valve, $m$, placed between the openings $k$ and $l$. If, therefore, the damper or valve $m$ is closed and the dampers or valves $j$ $j'$ are opened, the products of combustion which pass into the main central flue H are diverted and compelled to pass through each retort, and out of the same into the flues L L', thence into the flue M, and then into the main stack-flue, and thence to the exit of the stack.

It follows, also, that by a proper disposition of these several dampers or valves the volume of the products of combustion passing through the retorts may be regulated as to all the retorts, or as to those upon one side of the main central flue, or the products of combustion may pass directly to the flue H.

There is connected with these retorts I I' a system of pipes, O, upon each side of the furnace, by which air taken in from any convenient point $n$, shown in Fig. 2 as placed over the fire-box doors, is led through the furnace between the retorts, and by suitable branch pipes $o$, introduced at various points in each retort by small jets or currents, for the purpose of promoting and aiding combustion of the gases within such retorts. The smoke-stack P P' is composed of two portions, the inner portion, P, rising about as high as the furnace, with its flue H extending from the top, where it receives the products of combustion directly from the furnace, to the bottom, where it is connected by a flue, $p$, to the flue Q in the outer stack, which stack rises in a separate column to any required height. A water-pipe, R, arranged between the smoke-stacks P P', leads down a little way into the flue $p$, where it is furnished with a sprinkler, $q$, and a pipe, $r$, serves to carry off the accumulating water when it reaches a level sufficiently below the sprinkler to allow the passage of the products of combustion through the flue $p$.

A suitable door or covering-plate placed opposite said flue $p$ will make it convenient to remove the metal which may have been deposited in the water in said flue, and convenient pipes may be employed to draw off all the water from said flue $p$.

A modification of this furnace is shown in Fig. 3, where, instead of two fire-boxes, one on each side, there is a single or double central fire-box; but in other respects the two furnaces are alike, and the operation of both is similar.

The mode of use of our furnace is as follows, it being understood that the ore which is used is first crushed in any usual way, and that the heats are maintained by any convenient air-blast, and that suitable connections are had for the supply of water and air to the water and air pipes, under proper pressure, and that the furnace is in all respects ready for work: the ore in the hoppers is suffered to drop into the various retorts, preferably first upon one side in some descriptions of ores, where there is an advantage in working the sides alternately, in small charges, so that no portion of the charge will, by gravity, fall upon the aprons. The dampers are then so regulated that the products of combustion are diverted into the retorts thus charged, and the blast so regulated that there shall first be a roasting-heat, which is afterward increased. As the heat increases the ores become desulphurized, and the fumes from the ore, carrying with them more or less sulphur and fine particles of valuable mineral, pass into the flue H; then down to the flue $p$, where they are subjected to the spray from the sprinkler $q$, the result of which is that a large portion of the sulphur is converted into its proper acid, and mingles with the water in the flue $p$, while the remainder, with the metal, is deposited as a mat in the bottom of said flue. As the heats increase, arsenic and other more stubborn minerals are carried over in like manner with the fumes, and the process of conversion to acid and deposit goes on. It is here remarked that these deposits are removed from time to time, and broken and crushed and fed again into the retorts with the untreated ores. While this process of roasting and of purification goes on, the ore begins to melt, and by gravity flows down upon the slopes of the apron, which should have just so much pitch as to enable the melted metal which falls upon them to pass by gravitation down into the receiving-chambers. While the melted ore is passing over the slopes of the apron in a thin sheet, it is subjected to a very intense heat, which completes the process of the separation of the valuable ores from the stubborn mineral substances. The ore, finally falling into the receiving-chambers, there settles, the bullion sinking and the slag rising to the top.

It will be found advantageous, in dealing with ores requiring increasing heats for successful treatment, to have the process of charging go on alternately in the retorts on each side of the furnace, as thereby a sufficient heat for roasting may be diverted into the retorts on one side, while a much higher heat for melting is maintained in the retorts upon the other side, as thereby there will be a greater economy of fuel as well as greater convenience in working.

The advantages of the improvements hereinbefore described over the original patent, numbered 175,928, are in regard to the double apron, that it may have a broad base, and thus will be self-supporting, and will better resist the intense heat to which it is subjected, and is more readily and strongly reached by the heat from the fire-boxes.

The advantage of the air-pipes leading into the retorts is that it produces a better combustion of the gases therein.

The advantage of the novel water-pipe with wings is that it gives a better supporting-surface; and the advantage of the hoppers upon the furnace is that they can be charged conveniently and without loss of heat while the furnace is in operation.

In addition to the above advantages, attending the particular construction of the special portions above enumerated, there are some general advantages worthy of mention as due to the combination of the several parts of the furnace.

The economy of fuel is very great, because very little of the heat is absolutely wasted, and the greatest heat is employed at those points where the greatest heat is needed, viz., upon the slopes of the aprons, and the least heat where the least is required, viz., in the retorts, and all the parts are severally so arranged and disposed, one with the other, that the currents of the products of combustion move toward the smoke-stack without being reverted or turned back in opposite directions. It follows from this construction that great and uniform and easily-regulated heats can be maintained without excessive pressure of the air-blast, with a consequent economy of fuel, and with less wear and destruction of the more exposed portions of the furnace.

By the use of two fire-boxes there results a further economy, as the fuel can be burned in the most effective manner, viz., in a thin layer upon the grate-bars, and with less destruction of the grate-bars, and the heats are obtained from two sources of supply instead of one. By this double arrangement of fires the heats upon both slopes of the apron are more uniform, and the products of combustion are more uniformly diverted into the retorts upon each side of the main central flue.

Having thus described our invention, its manner of operation, and some of its advantages, what we claim as new therein, and our invention, is—

1. In a furnace for reducing ores, the combination of two fire-boxes, a central solid apron of masonry, having double divergent slopes, and supported on its base between said fire-boxes, and a central vertical flue directly above the apex of the apron, substantially as and for the purposes set forth.

2. In a furnace for reducing ores, the combination of two fire-boxes, a central solid masonry apron with double divergent slopes, and supported on its base between said fire-boxes, two receiving-chambers, each situated between the apron and one of the fire-boxes, and a central vertical flue directly above the apex of the apron, substantially as and for the purposes set forth.

3. In a furnace for reducing ores, the combination of the retorts I I', with air-pipes O o leading into them, to promote combustion of the gases, substantially as described.

4. In a furnace for reducing ores, the combination of the hoppers J, provided with valves K, the feeding-channels $h$, of small diameter relatively to the retorts, and inclined inwardly and entering the retorts near the center thereof, and the retorts I, inclined inwardly at a less angle than the feeding-channels, all substantially as and for the purposes set forth.

5. In furnaces, the water-pipes F F', with wings $e\,e$, substantially as and for the purposes set forth.

This specification signed and witnessed this 16th day of February, 1877.

GEO. W. CHENEY.
DON C. BUTTERFIELD.

Witnesses to signature of Geo. W. Cheney:
L. W. SEELY,
R. N. DYER.

Witnesses to signature of Don C. Butterfield:
H. H. TAPPEN,
H. T. WHITE, Jr.